United States Patent
Lepp et al.

(10) Patent No.: US 7,740,977 B2
(45) Date of Patent: Jun. 22, 2010

(54) VANADIUM REDOX BATTERY INCORPORATING MULTIPLE ELECTROLYTE RESERVOIRS

(75) Inventors: Gary Lepp, North Vancouver (CA); Matthew Albert MacLennan Harper, Vancouver (CA); Andy Klassen, North Vancouver (CA); Timothy David John Hennessy, Portland, OR (US)

(73) Assignee: JD Holding Inc., George Town, Grand Cayman (KY)

( * ) Notice: Subject to any disclaimer, the term of this patent is extended or adjusted under 35 U.S.C. 154(b) by 12 days.

(21) Appl. No.: 11/728,521

(22) Filed: Mar. 26, 2007

(65) Prior Publication Data

US 2008/0241643 A1 Oct. 2, 2008

(51) Int. Cl.
*H01M 2/36* (2006.01)
*H01M 2/38* (2006.01)

(52) U.S. Cl. .............................. 429/72; 429/80; 429/81
(58) Field of Classification Search ................... 429/71, 429/72–89
See application file for complete search history.

(56) References Cited

U.S. PATENT DOCUMENTS 6,475,661 B1 * 11/2002 Pellegri et al. .............. 429/105

2005/0158615 A1 * 7/2005 Samuel et al. ................ 429/81

FOREIGN PATENT DOCUMENTS

JP 60225366 A * 11/1985

OTHER PUBLICATIONS

International Search Report for PCT/US07/14276 filed Jun. 18, 2007, mailed on Aug. 18, 2008, 4 pgs.
Written Opinion of the International Searching Authority for PCT/US07/14276 filed Jun. 18, 2007, mailed on Aug. 18, 2008, 6 pgs.
Office Action for U.S. Appl. No. 11/234,778 from USPTO mailed Sep. 19, 2007, 16 pages.
International Preliminary Report and Written Opinion for PCT/US2007/14276 filed Jun. 18, 2007, mailed on Aug. 18, 2008, 7 pgs.

* cited by examiner

*Primary Examiner*—Dah-Wei D Yuan
*Assistant Examiner*—Steven Scully
(74) *Attorney, Agent, or Firm*—John R. Thompson; Stoel Rives LLP

(57) ABSTRACT

A vanadium redox battery energy storage system ("VRB-ESS") capable of modularly incorporating additional electrolyte reservoirs to increase energy capacity while allowing for efficient low-volume operation is disclosed. The VRB-ESS of the present invention may efficiently operate using a first volume of electrolyte solution, while maintaining a second volume of electrolyte solution to be made available to the VRB-ESS as additional energy storage capacity is required. Additionally, a cap mechanism to allow the VRB-ESS of the present invention to employ an industry standard IBC container as a secondary electrolyte reservoir is disclosed.

27 Claims, 5 Drawing Sheets

US 7,740,977 B2

VANADIUM REDOX BATTERY INCORPORATING MULTIPLE ELECTROLYTE RESERVOIRS

TECHNICAL FIELD

This invention relates to redox flow battery technology, in particular to systems and methods for providing a redox flow battery capable of efficient operation and modular capacity expansion.

BRIEF DESCRIPTION OF THE DRAWINGS

The various aspects and advantages of the invention are described by way of example in the following description of several embodiments and attached drawings. It should be understood that the accompanying drawings depict only typical embodiments and, as such, should not to be considered to limit the scope of the claims. The embodiments will be described and explained with specificity and detail in reference to the accompanying drawings in which:

DETAILED DESCRIPTION OF PREFERRED EMBODIMENTS

Figure 1:
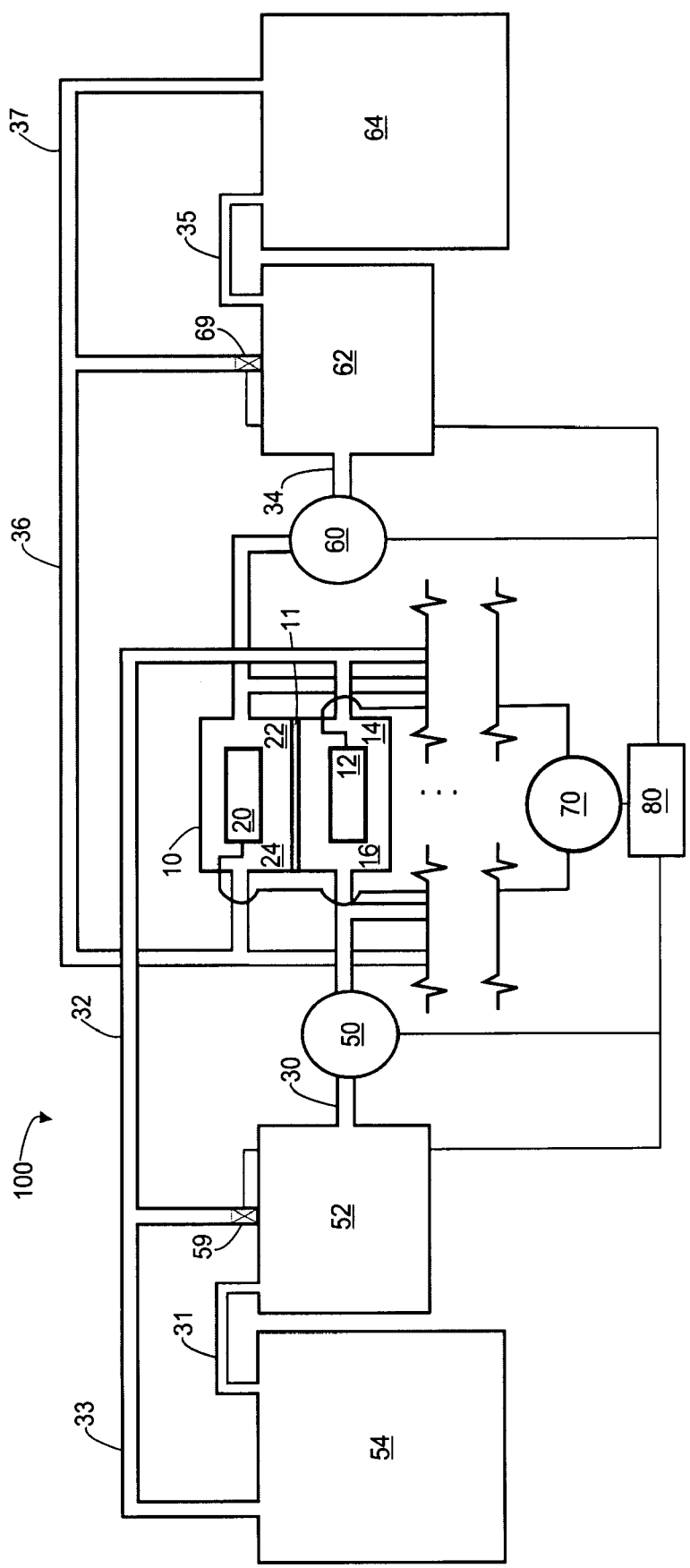
FIG. 1 is a block diagram of one embodiment of a vanadium redox battery energy storage system according to the teachings of the present invention.

Energy storage systems such as rechargeable batteries are an important part of electrical power systems, particularly electrical power systems supplied by wind turbine generators, photovoltaic cells, or the like. Energy storage systems may also be used in: enable energy arbitrage applications, the selling and buying power during off-peak hours; uninterruptible power sources (UPS); providing backup power; power quality applications in conjunction with a prime power source.

Vanadium redox flow battery energy storage systems (hereafter referred to as "VRB-ESS"), are ideal for use in these applications since they may respond quickly to changing loads (as required in UPS and power quality applications), and may be configured to have a large capacity (as needed in prime power source applications). An all-vanadium redox battery is described in U.S. Pat. No. 4,786,567 to Skyllas-Kazacos et al., which is hereby incorporated by reference.

A VRB-ESS typically generates electrical power by passing anolyte and catholyte electrolytic solutions through one or more cells. A VRB-ESS may include any number and configuration of cells depending on the instantaneous power demands of the system. Similarly, a VRB-ESS may have varying amounts of electrolyte solution available to it depending upon the energy capacity needs of the system. The number and cross-sectional area of the cells within the VRB-ESS may determine the amount of instantaneous power the VRB-ESS is capable of producing, and the volume of anolyte and catholyte electrolytic solutions available to the VRB-ESS may define its power storage and production capacity. A VRB-ESS having a cell stack is described in U.S. Pat. No. 6,475,661 to Pellegri et al., which is hereby incorporated by reference.

When acting as a UPS, or any other low-capacity application, it is desirable to reduce the amount of electrolytic solution circulated through the VRB-ESS. This is to minimize power losses in the electrolyte due to electrolyte self-discharge and to reduce the energy lost to pumping the electrolyte solution through the system. However, in high-capacity applications (i.e., prime power applications), it may be necessary to increase the VRB-ESS power storage capacity by providing additional electrolyte solution to the VRB-ESS via larger electrolyte reservoirs. Moreover, even in a low capacity UPS application, the VRB-ESS may require additional energy capacity in the event of a failure in the primary power source.

Even within these low-capacity and high-capacity modes, various VRB-ESS applications may have widely divergent capacity needs. For example, a VRB-ESS used as a UPS for a single floor of an office building may require significantly less capacity than a VRB-ESS used as a UPS for the entire building or group of buildings. As such, it is difficult to produce a VRB-ESS having electrolyte reservoirs capable of efficiently providing for these widely varying capacity requirements. This is particularly true in UPS applications were it is most efficient to operate the VRB-ESS using a limited supply of electrolyte, but a large amount of electrolyte may be required to provide for the possibility of a long-term failure in the prime power source.

The need to handle varying capacity requirements may force customers to use a VRB-ESS having significantly higher capacity than needed, resulting in lower efficiency operation. Similarly, a customer constrained by limited space, may be required to purchase custom sized electrolyte reservoirs, significantly increasing the cost of the system. Moreover, even in very high-capacity UPS applications, it is preferable to run the VRB-ESS with as little electrolyte as possible during standby operation to improve efficiency and preserve the charge of the unused electrolyte in the event of failure in the prime power source.

Shipping and installation of a VRB-ESS can be a time-consuming and dangerous task for the end-user. The electrolytic solutions used in VRB-ESS systems have been classified by the United Nations ("UN") and United States Department of Transportation ("DoT") as hazardous materials. As such, the anolyte and catholyte solutions used in the VRB-ESS must be transported to the end-user installation site in an approved container. These containers are generally referred to in the art as Intermediate Bulk Containers (hereafter referred to as "IBC"). Such containers generally must be certified for use with hazardous materials. IBCs may be certified for the shipment of hazardous liquids under DoT and/or UN regulations. The certification procedures for IBCs may be rigorous, typically requiring many months' work and hundreds of hours of testing. The entire IBC must be tested and certified, including any cap mechanism on the IBC.

Since the electrolytic solutions of the VRB-ESS may pose a substantial heath risks to the end-user, it is desirable to minimize the amount of direct contact the end-user has with the electrolyte. In most VRB-ESS systems, the anolyte and catholyte solutions must be transferred from the IBC used for shipment into a VRB-ESS reservoir. This transfer can be dangerous to the end-user and pose a risk of allowing potentially hazardous material to spill into the environment. However, this transfer may be necessary since the VRB-ESS may not be capable of using electrolytic solutions contained in a standard IBC container. Moreover, the transfer may be necessary because the certified shipping cap mechanism on the IBC is not capable of creating an acceptable seal to allow for the safe and reliable flow of electrolyte to and from the IBC.

The present invention discloses a system and method for addressing many of these problems. A VRB-ESS is described that is capable of modularly incorporating additional electrolyte reservoirs to increase the energy capacity of the system. The VRB-ESS of the present invention may efficiently operate using a first volume of electrolyte solution, while maintaining a second volume of electrolyte solution to be made available to the VRB-ESS as additional capacity is required. Additionally, the VRB-ESS of the present invention may incorporate industry standard IBC containers, obviating the need for dangerous fluid transfers, increasing the safety and flexibility of the VRB-ESS.

FIG. 1 is a block diagram of one embodiment of a VRB-ESS 100 incorporating the teachings of the present invention. The VRB-ESS of embodiment 100 may include one or more cells 10. Each cell 10 may comprise negative electrode 12 disposed within negative compartment 14 and positive electrode 20 disposed within positive compartment 22. Suitable electrodes include any number of components known in the art and may include electrodes manufactured in accordance with the teachings of U.S. Pat. No. 5,665,212 to Zhong et al., which is hereby incorporated by reference.

Negative compartment 14 may include anolyte solution 16 in electrical communication with negative electrode 12. Anolyte solution 16 may be an electrolyte, containing redox ions which are in a reduced state and are to be oxidized during a discharge process of the cell 10, or are in an oxidized state and are to be reduced during the charging process of the cell 10, or which are a mixture of reduced ions and ions to be reduced.

By way of example, in VRB-ESS 100 the charge-discharge redox reaction occurring at negative electrode 12 in anolyte solution 16 may be represented by Equation 1.1:

$$V^{2+} \leftrightarrow V^{3+} + e^-  \qquad \text{Eq. 1.1}$$

Positive compartment 22 may contain a catholyte solution 24 in electrical communication with positive electrode 20. Catholyte solution 24 may be an electrolyte containing specified redox ions which are in an oxidized state and are to be reduced during the discharge process of a cell 10, or are in a reduced state and are to be oxidized during the charging process of the cell 10, or which are a mixture of these oxidized ions and ions to be oxidized. By way of example, the charge-discharge redox reaction occurring at the positive electrode 20 in the catholyte solution 24 may be represented by Equation 1.2:

$$V^{4+} \leftrightarrow V^{5+} + e^-  \qquad \text{Eq. 1.2}$$

Anolyte solution 16 and catholyte solution 24 may be prepared in accordance with the teachings of U.S. Pat. Nos. 4,786,567, 6,143,443, 6,468,688, and 6,562,514, which are hereby incorporated by reference, or by other techniques known in the art.

Each cell 10 may include an ionically conducting membrane 11 disposed between positive compartment 22 and negative compartment 14 of cell 10. Membrane 11 may be in fluid contact with catholyte solution 24 and anolyte solution 16 to provide ionic communication therebetween. Membrane 11 may serve as a proton exchange membrane. Membrane 11 may be embodied as an anion membrane or a cation membrane and may include a carbon material which may be perfluorinated.

Anolyte solution 16 may be held in a first anolyte reservoir 52. Anolyte reservoir 52 may be embodied as a tank, bladder, IBC, or other container capable of holding an anolyte solution known in the art. First anolyte reservoir 52 may be in fluid communication with negative compartment 14 via first anolyte supply connection 30 and first anolyte return connection 32. In embodiment 100, anolyte solution contained in first anolyte reservoir 52 may flow into negative compartment 14 of cell 10 via first anolyte supply connection 30, and may flow out of negative compartment 14 of cell 10 to first anolyte reservoir 52 via first anolyte return connection 32. First anolyte supply connection 30 and first anolyte return connection 32 may comprise any type of fluid conduit known in the art capable of containing an anolyte solution.

Catholyte solution 24 may be held in a first catholyte reservoir 62. First catholyte reservoir 62 may be embodied as a tank, bladder, IBC, or other container capable of holding a catholyte solution known in the art. First catholyte reservoir 62 may be in fluid communication with positive compartment 22 via first catholyte supply connection 34 and first catholyte return connection 36. In embodiment 100, catholyte solution contained in first catholyte reservoir 62 may flow into positive compartment 22 of cell 10 via first catholyte supply connection 34, and may flow out of positive compartment 22 of cell 10 to first catholyte reservoir 62 via first catholyte return connection 36. First anolyte supply connection 30 and first anolyte return connection 32 may comprise any type of fluid conduit known in the art capable of containing an anolyte solution.

In embodiment 100, first anolyte supply connection 30 may be in fluid communication with anolyte pump 50. Anolyte pump 50 may regulate and enable the flow of anolyte solution within first anolyte reservoir 52 through first anolyte supply connection 30 into negative compartment 14. Anolyte pump 50 may further regulate and enable anolyte 16 to flow from negative compartment 14 through first anolyte return connection 32 into anolyte reservoir 52. Anolyte pump 50 may be a variable flow-rate pump, wherein the rate of anolyte pump 50 determines the flow rate of anolyte 16 through negative compartment 14. Anolyte pump 50 may be communicatively coupled to system controller 80. In embodiment 100, system controller 80 may regulate the flow of anolyte through negative compartment 14 by controlling the flow-rate of anolyte pump 50.

In embodiment 100, first catholyte supply connection 34 may be in fluid communication with catholyte pump 60. Catholyte pump 60 may regulate and enable fluid the flow of catholyte solution within first catholyte reservoir 62 through catholyte supply connection 34 into positive compartment 22. Catholyte pump 60 may further regulate and enable catholyte 24 to flow from positive compartment 22 through first catholyte return connection 36 into first catholyte reservoir 62. Catholyte pump 60 may be a variable flow-rate pump, wherein the rate of catholyte pump 60 determines the flow-rate of catholyte 24 through positive compartment 22. Catholyte pump 60 may be communicatively coupled to system controller 80. In embodiment 100, system controller 80 may regulate the flow of catholyte through positive compartment 22 by controlling the flow-rate of catholyte pump 60.

Embodiment 100 may comprise second anolyte reservoir 54. Second anolyte reservoir 54 may be embodied as a tank, bladder, IBC, or other container known in the art that is capable of holding an anolyte solution. Second anolyte reservoir 54 may be in fluid communication with first anolyte reservoir 52 via second anolyte supply piping connection 31.

Second anolyte reservoir 54 may also be in fluid communication with negative compartment 14 via second anolyte return piping connection 33.

Embodiment 100 further comprise second catholyte reservoir 64. Second catholyte reservoir 64 may be embodied as a tank, bladder, IBC, or other container known in the art that is capable of holding a catholyte solution. Second catholyte reservoir 64 may be in fluid communication with first catholyte reservoir 62 via second catholyte supply piping connection 35. Second catholyte reservoir 64 may be in fluid communication with positive compartment 22 via second catholyte return piping connection 37.

Negative electrode 12 and positive electrode 20 may be in electrical communication with switching module 70. Switching module 70 may be capable of electrically coupling negative electrode 12 and positive electrode 20 to power source 72 (not shown) or load 74 (not shown). Switching module 70 may be disposed in series between power source 72 and each negative electrode 12. Switching module 70 may also be disposed in series between load 74 and each negative electrode 12. This circuit arrangement allows switching module 70 to selectably connect VRB-ESS 100 to power source 72 or load 74. In embodiment 100, switching module 70 is communicatively coupled to system controller 80, allowing system controller 80 to selectively connect cell 10 with power source 72 or load 74. One skilled in the art will appreciate that alternative circuit layouts and configurations are possible, as such, the embodiment of FIG. 1 is provided for illustrative purposes only.

Embodiment 100 may be configured to circulate only the electrolytic solutions contained in first anolyte reservoir 52 and first catholyte reservoir 62. When so configured, the VRB-ESS of embodiment 100 may be said to be operating in "low-volume" mode. Alternatively, embodiment 100 may be configured to circulate the electrolytic solutions contained in both first and second anolyte reservoirs 52, 54 and first and second catholyte reservoirs 62, 64. When so configured the VRB-ESS of embodiment 100 may be said to be operating in "full-volume" mode.

As used herein, a piping connection, such as second anolyte supply piping connection 31, second anolyte return piping connection 33, second catholyte supply piping connection 35, and second catholyte return piping connection 37, or a fluid connection such as anolyte supply connection 30, anolyte return connection 32, catholyte supply connection 34, and catholyte return connection 36, may be comprised of any fluid conduit capable of holding an electrolytic solution. Such fluid conduit may comprise: braid reinforced plastic tubing; fiber reinforced rubber tubing; multi-layer composite hose; polyethylene tubing; reinforced rubber tubing; or the like. It would be understood by one having skill in the art that any number of different fluid conduit materials may be used without departing from the teachings of the present invention.

In order to configure embodiment 100 to be in "full-volume" mode, first anolyte return valve 59 and first catholyte return valve 69 may be placed into a closed state. This may prevent anolyte flowing from negative compartment 14 of cell 10 via connection 32 from flowing into first anolyte reservoir 52; instead, in this configuration, anolyte flowing through first anolyte return connection 32 flows into second anolyte reservoir 54 via second anolyte return piping connection 33. As anolyte flows into second anolyte reservoir 54, second anolyte reservoir 54 may fill, creating an overflow condition within second anolyte reservoir 54. This overflow condition may cause anolyte to flow out of second anolyte reservoir 54 into first anolyte reservoir 52 via second anolyte supply piping connection 31. In an alternative embodiment, the VRB-ESS may be configured to the "full-volume" mode by opening an anolyte supply valve (not shown) in fluid connection 31, and by locating fluid connection 31 near the bottom of reservoir 54 such that it is always in contact with the anolyte no matter how full the reservoir is.

In "full-volume" mode, the closure of first catholyte return valve 69 may prevent catholyte flowing from positive compartment 22 of cell 10 via connection 36 from flowing into first catholyte reservoir 62; instead, in this configuration, catholyte flowing through first catholyte return connection 36 may flow into second catholyte reservoir 64 via second catholyte return piping connection 37. As catholyte flows into second catholyte reservoir 64, second catholyte reservoir 64 may fill, creating an overflow condition within second catholyte reservoir 64. This overflow condition may cause catholyte to flow out of second catholyte reservoir 64 into first catholyte reservoir 62 via second catholyte supply piping connection 35. Thus, in "full-volume" mode, the anolyte in second anolyte reservoir 54 may flow in series through first anolyte reservoir 52, and the catholyte within second catholyte reservoir 64 may flow in series through first catholyte reservoir 62. As such, in "full-volume" mode, all of the electrolyte contained within reservoirs 52, 54, 62, 64 may circulate through VRB-ESS 100.

In order to configure embodiment 100 to be in "low-volume" mode, first anolyte return valve 59 and first catholyte return valve 69 may be opened. In this configuration, anolyte flowing from negative compartment 14 of cell 10 via anolyte return connection 32 may flow into first anolyte reservoir 52. In one embodiment, second anolyte return piping connection 33 may be elevated relative to first anolyte return connection 32 or cell 10. This differential may prevent anolyte flowing from negative compartment 14 via first anolyte return connection 32 from flowing into second anolyte reservoir 54 when first anolyte return valve 59 is in an open position. In an alternative embodiment, second anolyte return piping connection 33 may comprise a second anolyte return valve (not shown) to prevent anolyte from flowing into second anolyte reservoir 54 in "low-volume" mode. Accordingly, in "low-volume" mode no overflow condition may be created within second anolyte reservoir 54. As such, in "low-volume" mode, anolyte may not flow from second anolyte reservoir 54 to first anolyte reservoir 52 via second anolyte supply piping connection 31.

In "low-volume" mode, catholyte flowing from positive compartment 22 of cell 10 via catholyte return connection 36 may flow into first catholyte reservoir 62. In one embodiment, second catholyte return piping connection 37 may be elevated relative to first catholyte return connection 36 or cell 10. This differential may prevent catholyte flowing from positive compartment 22 via first catholyte return connection 36 from flowing into second catholyte reservoir 64 when first catholyte return valve 69 is in an open position. In an alternative embodiment, second catholyte return piping connection 33 may comprise a second catholyte return valve (not shown) to prevent catholyte from flowing into second catholyte reservoir 64 in "low-volume" mode. Accordingly, in "low-volume" mode no overflow condition may be created within second catholyte reservoir 64. As such, in "low-volume" mode, catholyte may not flow from second catholyte reservoir 64 to first catholyte reservoir 62 via second catholyte supply piping connection 35. Thus, in "low-volume" mode, the electrolyte solution contained in second anolyte reservoir 54 and second catholyte reservoir 54 may be substantially isolated from VRB-ESS 100.

The anolyte and catholyte electrolytic solutions of VRB-ESS 100 may be charged by configuring switching module 70 to connect power source 72 (not shown) to negative electrode 12 and positive electrode 20 of cell 10. The electrical energy delivered through negative electrode 12 may produce divalent vanadium ions in anolyte solution 16 as represented by Equation 1.3:

$$V^{3+} + e^- \rightarrow V^{2+}$$ Eq. 1.3

The electrical energy delivered through positive electrode 20 may produce quinvalent vanadium ions in catholyte solution 24 as represented by Equation 1.4:

$$V^{5+} + e^- \rightarrow V^{4+}$$ Eq. 1.4

When charged, each cell 10 may provide an open-circuit voltage of approximately 1.41V at 25° C.

Switching module 70 may be configured to withdraw electrical energy from cell 10 by connecting cell 10 to load 74 (not shown). This causes load 72 (not shown) to withdraw electrical energy from anolyte solution 16 within negative compartment 14 and catholyte solution 24 within positive compartment 22. This withdrawal of electrical energy may produce trivalent vanadium ions within anolyte solution 16 as represented by Equation 1.5 and may produce quadvalent vanadium ions in catholyte solution 24 within positive compartment 22 as represented by Equation 1.6:

$$V^{2+} \rightarrow V^{3+} + e^-$$ Eq. 1.5

$$V^{4+} \rightarrow V^{5+} + e^-$$ Eq. 1.6

As electrical energy is withdrawn from cell 10, the anolyte solution 16 within negative compartment 14 and the catholyte solution 24 within positive compartment 22 may become discharged. As such, anolyte pump 50 may be used to circulate additional anolyte into negative compartment 14 via first anolyte supply connection 30, expelling anolyte 16 within negative compartment 14 via first anolyte return connection 32. Catholyte pump 60 may be used to pump catholyte via catholyte supply connection 34 into positive compartment 22, forcing catholyte 24 within positive compartment 22 to flow out of positive compartment 22 via first catholyte return connection 36.

Figure 2:
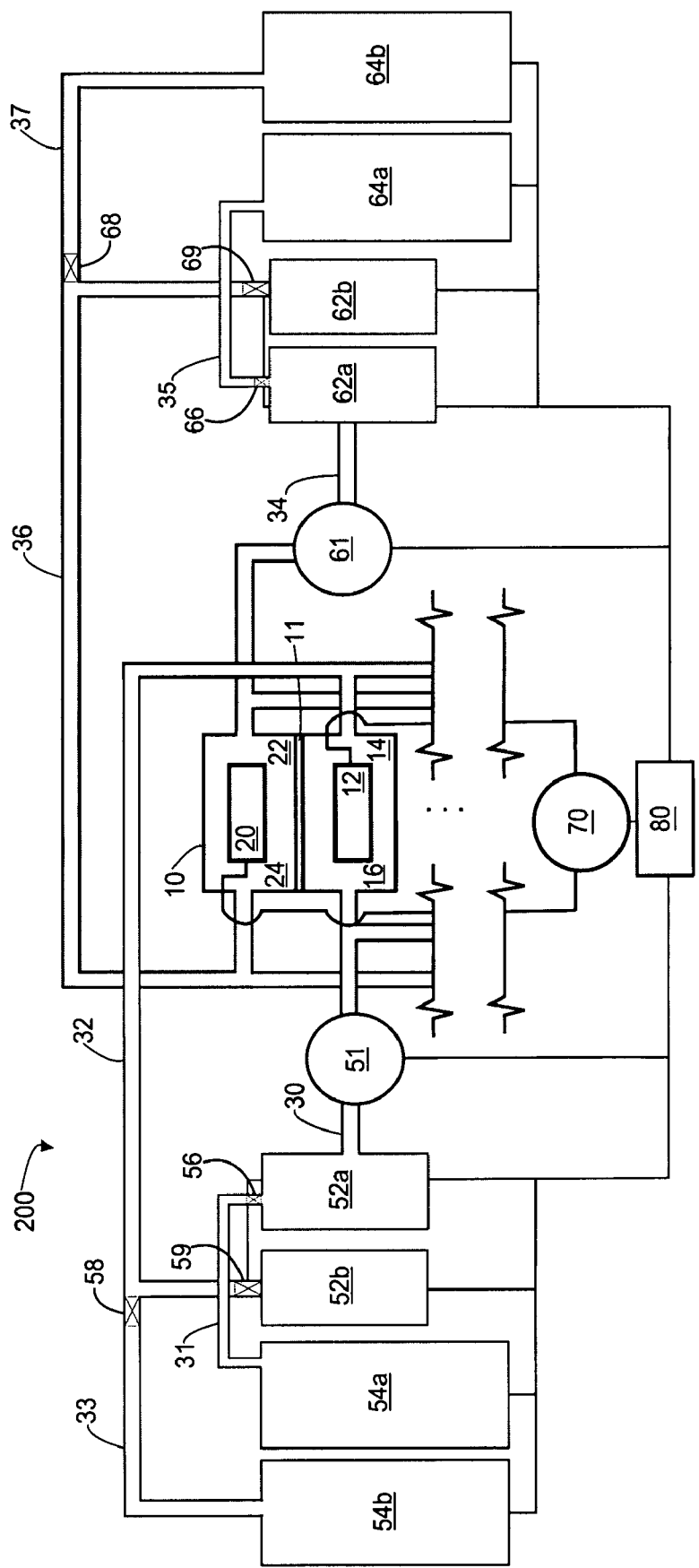
FIG. 2 is a block diagram of one embodiment of a vanadium redox battery energy storage system according to the teachings of the present invention.

FIG. 2 shows another embodiment 200 of the present invention in which first anolyte reservoir 52 of FIG. 1 is comprised of reservoir 52a and 52b. In this embodiment 200, first anolyte reservoir 52a may contain substantially charged anolyte, and first anolyte reservoir 52b may contain substantially discharged anolyte. Similarly, reservoir 62 of FIG. 1 may be comprised of two reservoirs 62a and 62b. In this embodiment, first catholyte reservoir 62a may contain substantially charged catholyte, and first catholyte reservoir 62b may contain substantially discharged catholyte.

In like manner, second anolyte reservoir 54 of FIG. 1 may be comprised of reservoir 54a and 54b, wherein second anolyte reservoir 54a may contain substantially charged anolyte, and second anolyte reservoir 54b may contain substantially discharged anolyte. Similarly, second catholyte reservoir 64 of FIG. 1 may be comprised of reservoir 64a and 64b, wherein second catholyte reservoir 64a may contain substantially charged catholyte, and second catholyte reservoir 64b may contain substantially discharged catholyte.

Like embodiment 100, the VRB-ESS of embodiment 200 may be operated in a "low-volume" mode, wherein only the electrolytic solutions contained within first anolyte reservoir 52a, 52b, and first catholyte reservoir 62a, 62b, may flow through cell 10. Alternatively, the VRB-ESS of embodiment 200 may be operated in a "full-volume" mode, wherein the electrolyte solutions contained within first anolyte reservoir 52a, 52b, second anolyte reservoir 54a, 54b, first catholyte 62a, 62b, and second catholyte reservoir 64a, 64b may be circulated through cell 10.

Electrical energy may be stored in the VRB-ESS of embodiment 200 by causing switching module 70 to connect cell 10 to power source 72 (not shown), creating an electrical connection between power source 72 and negative electrode 12 and positive electrode 20 of cell 10. In this configuration, anolyte 16 within negative compartment 14 and catholyte 24 within positive compartment 22 may be charged as described above in conjunction with FIG. 1. In order to charge additional electrolyte, reversible anolyte pump 51 may be employed to circulate anolyte into negative compartment 14 of cell 10, and reversible catholyte pump 61 may be employed to circulate catholyte into positive compartment 22 of cell 10. The fluid movement caused by reversible anolyte pump 51 may cause the anolyte solution within first substantially discharged anolyte reservoirs 52b, 54b to be transferred to first substantially charged anolyte reservoirs 52a, 54a. Similarly, the fluid movement of catholyte caused by reversible catholyte pump 61 may cause the catholyte solution within first substantially discharged catholyte reservoirs 62b, 64b to be transferred to first substantially charged anolyte reservoirs 62a, 64a. In one embodiment, the flow created by reversible anolyte pump 51 and reversible catholyte pump 61 may reverse depending on whether VRB-ESS 200 is charging or discharging.

Electrical energy may be extracted from VRB-ESS of embodiment 200 by causing switching module 70 to connect cell 10 to load 74 (not shown), creating an electrical connection between load 74 and negative electrode 12 and positive electrode 20 of cell 10. In this configuration, energy is extracted from anolyte 16 within negative compartment 14 and catholyte 24 within positive compartment 22 as described above in conjunction with FIG. 1. Upon extraction of electrical power from anolyte 16 and catholyte 24, additional electrical energy may be required. In order to provide this electrical energy, additional electrolyte may be circulated through the system. Reversible anolyte pump 51 may be employed to circulate anolyte into negative compartment 14 of cell 10, and reversible catholyte pump 61 may be employed to circulate catholyte into positive compartment 22 of cell 10. The fluid movement caused by reversible anolyte pump 51 may cause the anolyte within first substantially charged anolyte reservoirs 52a, 62a to flow through anolyte supply connection 30 into negative compartment 14 of cell 10; this flow may further cause anolyte 16 within negative compartment 14 to flow out of cell 10 through anolyte return connection 32. The fluid movement caused by reversible catholyte pump 61 may cause the catholyte within first substantially charged catholyte reservoir 62a, 64a to flow through catholyte supply connection 34 into positive compartment 22 of cell 10; this flow may further cause catholyte 24 within positive compartment 22 to flow out of cell 10 through catholyte return connection 36.

The VRB-ESS of embodiment 200 may operate using only first anolyte reservoir 52a, 52b, and first catholyte reservoir 62a, 62b. This configuration may be referred to as a "low-volume" mode of embodiment 200. Alternatively, embodiment 200 may operate using first and second anolyte reservoirs 52a, 52b, 64a, 64b and first and second catholyte reservoirs 62a, 62b, 64a, 64b. This configuration may be referred to as a "full-volume" mode of embodiment 200. In one embodiment 200, the volume of second anolyte reservoir 54a, 54b may be substantially larger than the volume of first anolyte reservoir 52a, 52b, and the volume of second catholyte reservoir 64a, 64b may be substantially larger than the volume of first catholyte reservoir 62a, 62b. In this configuration, VRB-ESS 200 may be efficiently operated in "low-volume" mode, minimizing losses due to electrolyte self-discharge and pumping energy, while maintaining a substantially larger volume of electrolyte for use as needed.

Embodiment 200 may be placed in "low-volume" mode by placing second anolyte supply valve 56, second anolyte return valve 58, second catholyte supply valve 66, and second catholyte return valve 68 in a closed position and placing first anolyte return valve 59 and first catholyte return valve 69 in an open position. In this configuration, anolyte contained in second substantially charged anolyte reservoir 54a is prevented from flowing into first substantially charged anolyte reservoir 52a or negative compartment 14 of cell 10, and catholyte contained in second substantially charged catholyte reservoir 64a is prevented from flowing into first substantially charged catholyte reservoir 62a or positive compartment 22 of cell 10. Additionally, in this configuration, anolyte flowing from negative compartment 14 of cell 10 is prevented from flowing into second substantially discharged anolyte reservoir 54b, and catholyte flowing from positive compartment 22 of cell 10 is prevented from flowing into second substantially discharged catholyte reservoir 64b.

Embodiment 200 may be placed in a "full-volume" mode by placing second anolyte supply valve 56, second anolyte return valve 58, second catholyte supply valve 66, and second catholyte return valve 68 in an open position. In this configuration, anolyte contained within second substantially charged anolyte reservoir 54a may flow into first substantially charged anolyte reservoir 52a and negative compartment 14 of cell 10, and catholyte contained within second substantially charged catholyte reservoir 64a may flow into first substantially charged catholyte reservoir 62a and positive compartment 22 of cell 10. Additionally, in this configuration first anolyte return valve 59 and first catholyte return valve 69 may be placed in a closed position, and second anolyte return valve 58 and second catholyte return valve 68 may be placed in an open position. In this configuration, anolyte flowing from negative compartment 14 of cell 10 flows into second substantially discharged anolyte reservoir 54b, and catholyte flowing from positive compartment 22 of cell 10 flows into second substantially discharged catholyte reservoir 64b.

In embodiment 200, first anolyte reservoir 52a, 52b, second anolyte reservoir 54a, 54b, first catholyte reservoir 62a, 62b, and second catholyte reservoir 64a, 64b may be communicatively coupled with system controller 80, such that system controller 80 may monitor the volume level of each reservoir 52, 54, 62, 64. In this embodiment, system controller 80 may determine the volume of electrolyte contained within first anolyte reservoir 52a, 52b, first catholyte reservoir 62a, 62b, second anolyte reservoir 54a, 54b, and second catholyte reservoir 64a, 64b.

In this embodiment, while VRB-ESS 200 is charged in "full-volume" mode, system controller 80 may cause first anolyte return valve 59 to be placed in an open state and second anolyte return valve 58 to be placed in a closed state until substantially all of the anolyte contained within first substantially discharged anolyte reservoir 52b has been circulated through negative compartment 14 of cell 10. Upon detecting this condition, system controller 80 may cause first anolyte return valve 59 to be placed in a closed position, and second anolyte return valve 58 to be placed in an open position, allowing anolyte within second substantially discharged anolyte reservoir 54b to flow through negative compartment 14 of cell 10. Similarly, during "full-volume" charging, system controller 80 may cause first catholyte return valve 69 to be placed in an open state and second catholyte return valve 68 to be placed in a closed state until substantially all of the catholyte contained within first substantially discharged catholyte reservoir 62b has been circulated through positive compartment 22 of cell 10. Upon detecting this condition, system controller 80 may cause first catholyte return valve 69 to be placed in a closed position, and second anolyte return valve 58 to be placed in an open position, allowing catholyte within second substantially discharged catholyte reservoir 64b to flow through positive compartment 22 of cell 10.

In embodiment 200, while VRB-ESS 200 is discharged in "full-volume" mode, system controller 80 may cause first anolyte return valve 59 to be placed in an open position and second anolyte return valve 58 to be placed in a closed position until first substantially discharged anolyte reservoir 52b contains a volume of anolyte substantially equivalent to that originally contained in first substantially charged reservoir 52a. Upon detecting this condition, system controller 80 may cause first anolyte return valve 59 to be placed into a closed position and second anolyte return valve 58 to be placed in an open position, allowing anolyte to flow into second substantially discharged anolyte reservoir 54b. Similarly, system controller 80 may cause first catholyte return valve 69 to be placed in an open position and second anolyte return valve 58 to be placed in a closed position until first substantially discharged catholyte reservoir 62b contains a volume of catholyte substantially equivalent to that originally contained in first substantially charged catholyte reservoir 62a. Upon detecting this condition, system controller 80 may cause first catholyte return valve 69 to be placed in a closed position and second anolyte return valve 58 to be placed in an open position, allowing catholyte to flow into second substantially discharged catholyte reservoir 64b.

Figure 3:
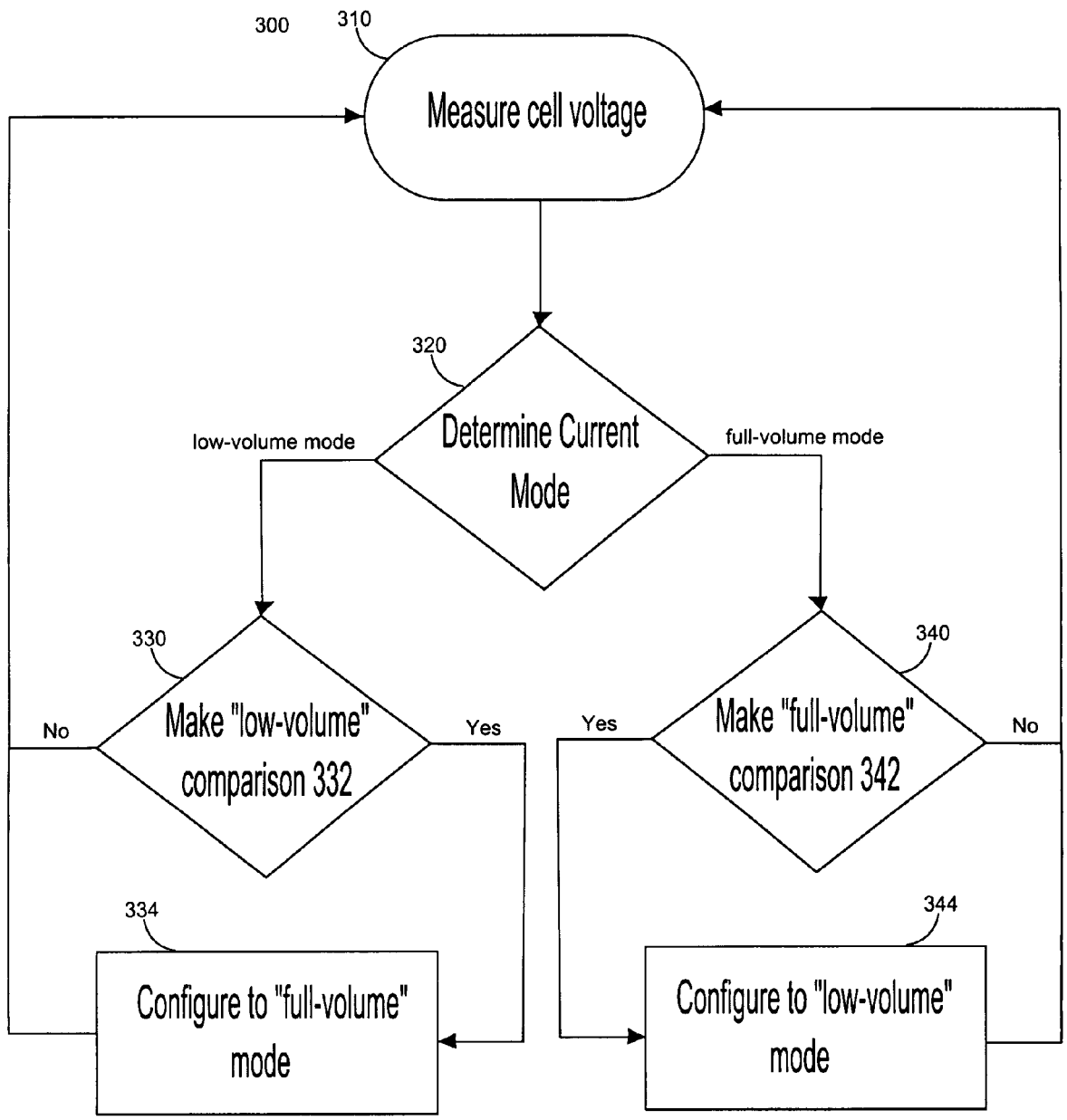
FIG. 3 is a flow chart illustrating a processing method for modifying the capacity of a vanadium redox battery energy storage system according to the teachings of the present invention.

Turning now to FIG. 3, as described above, embodiments 100 and 200 may be configured to operate in "low-volume" mode or "full-volume" mode. In one embodiment, the volume of anolyte and catholyte reservoirs 52 and 62 may be relatively small compared to the volume of second anolyte and catholyte reservoirs 54 and 64. In this configuration, the VRB-ESS of the present invention may operate efficiently using a relatively small volume of electrolyte solution ("low-volume") mode, while maintaining a larger volume of electrolyte as needed. "Low-volume" operation of VRB-ESS 100 may minimize power losses due to electrolyte self-discharge and pumping. In addition, "low-volume" operation may allow any electrolytic solution contained within second electrolyte reservoirs 54, 64 to be maintained at a high-level of charge for use as needed.

As described above, system controller 80 of embodiment 100, 200 may be communicatively coupled to cell 10. In this configuration, system controller 80 may monitor the electrochemical state of cell 10. This monitoring may comprise: measuring a voltage generated by cell 10; measuring an electrical current flowing into or out of cell 10; measuring the temperature of cell 10; and/or measuring the charge level of the electrolyte within cell 10. During operation, system controller 80 may monitor cell 10 and change the configuration of VRB-ESS 100, 200 responsive to conditions within cell 10. Additionally, system controller 80 may change the configuration of VRB-ESS 100, 200 based on an externally generated control signal. Flow chart 300 provides a flow diagram of one method of monitoring and configuring a VRB-ESS incorporating the teachings of the present invention.

At step 310, the system controller may monitor one or more electrochemical properties of each cell 10 in a VRB-ESS. The measurement performed at 310 may be periodic, such that measurement 310 may occur at regularly scheduled intervals. In one embodiment, this monitoring period may change depending on the mode of operation of the VRB-ESS, or may change responsive to an externally generated control signal. At step 320, the flow may branch depending on the current operational mode of the VRB-ESS. In one embodiment, step 320 may branch depending on whether the VRB-ESS is currently operating in "low-volume" or "full-volume" mode. At step 320, if the VRB-ESS is operating in "low-volume" mode, the flow continues to 330 and, if the VRB-ESS is operating in "full-volume" mode, the flow continues to 340.

At 330, "low-volume" comparison 332 may be performed. "Low-volume" comparison 332 may compare the electrochemical state of cell 10 measured at 310 to a threshold condition. For example, in one embodiment, during VRB-ESS discharge this comparison could comprise comparing the voltage generated by cell 10 to a threshold voltage. In this embodiment, if comparison 332 determines that the cell voltage measured at 310 is above the threshold voltage of 332, the flow may continue at 310. However, in this embodiment, if comparison 332 determines that the cell voltage measured at 310 is below the threshold voltage of 332, the flow may proceed to 334. In another embodiment, "low-volume" comparison 332 may compare the current flowing from cell 10 or the state of charge of the electrolyte within cell 10 to a threshold value. In this embodiment, if the current flowing from cell 10 is above a threshold value, or the charge state of the electrolyte within cell 10 has fallen below a threshold value, the flow may continue to 334. In one embodiment, comparison 332 may comprise a time component, such that the flow will only proceed to 334 if the electrochemical state of cell 10 measured at 310 has been maintained for a specified period of time. Additionally, comparison 332 may respond to an externally generated control signal, said signal causing the flow to proceed to 334. At 334, the system controller may configure the VRB-ESS to operate in "full-volume" mode. After making the configuration of 334, the flow may continue to 310.

At 340, "full-volume" comparison 342 may be performed. "Full-volume" comparison 342 may compare the electrochemical state of cell 10 measured at 310 to a threshold condition. For example, in one embodiment, during VRB-ESS charge this comparison could comprise comparing the voltage generated by cell 10 to a threshold voltage. In this embodiment, if comparison 342 determines that the cell voltage measured at 310 is below the threshold voltage of 342, the flow may continue at 310, and, if comparison 342 determines that the cell voltage measured at 310 is above the threshold voltage of 342, the flow may proceed to 344. In another embodiment, "full-volume" comparison 342 may compare the current flowing into cell 10 or the state of charge of the electrolyte within cell 10 to a threshold value. In this embodiment, if the current flowing into cell 10 is below a threshold value, or the charge state of the electrolyte within cell 10 has risen above a threshold value, the flow may continue to 344. In one embodiment, comparison 342 may also comprise a time component, such that the flow will only proceed to 344 if the electrochemical state of cell 10 measured at 310 has been maintained for a specified period of time. Additionally, comparison 342 may respond to an externally generated control signal, said signal causing the flow to proceed to 344. At 344, the system controller may configure the VRB-ESS to operate in "low-volume" mode. After making the configuration of 344, the flow may continue to 310.

Figure 4:
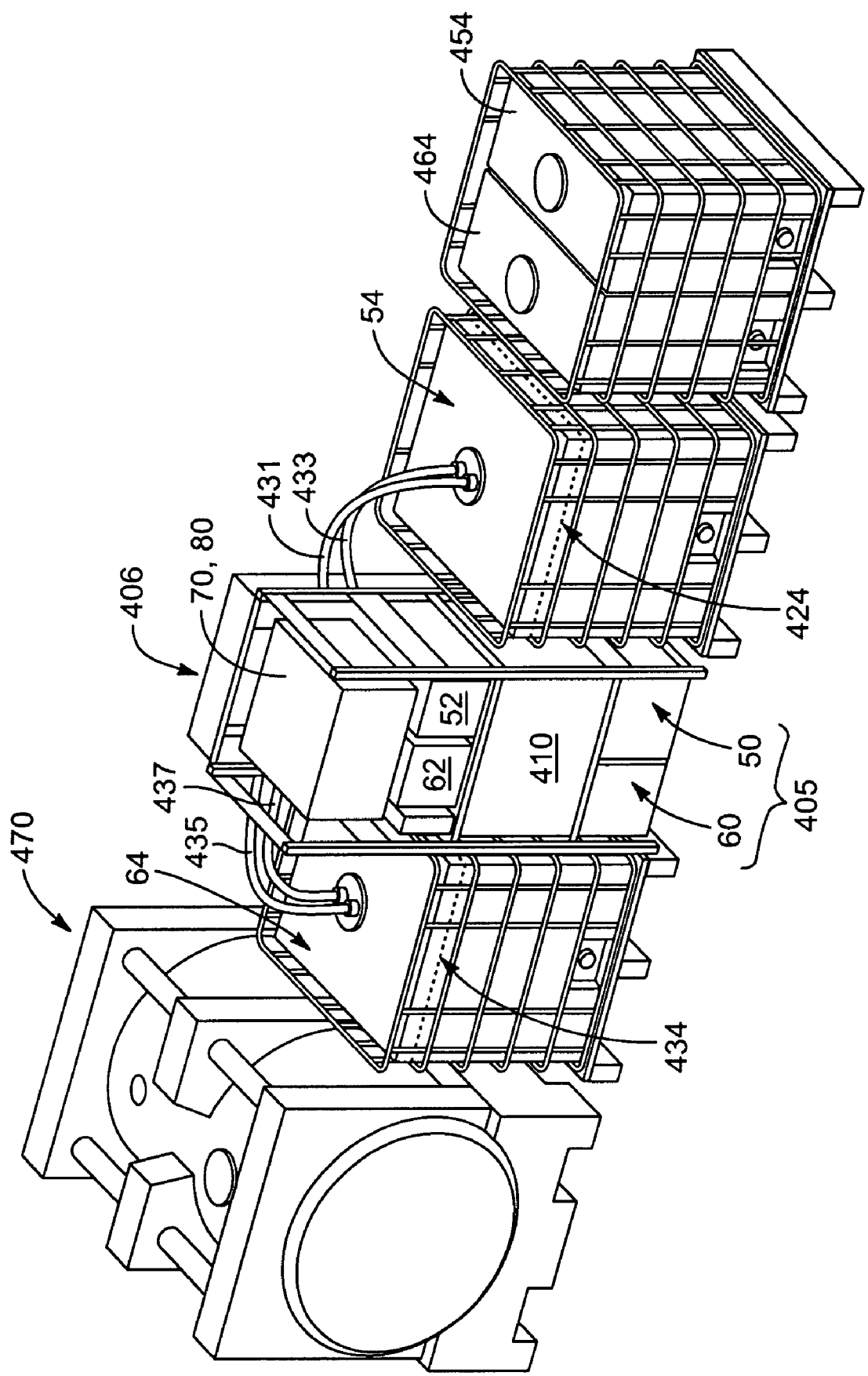
FIG. 4 is a depiction of one embodiment of a vanadium redox flow battery energy storage system according to the teachings of the present invention.

FIG. 4 shows another embodiment of a VRB-ESS 400 according to the teachings of the present invention. In embodiment 400, system module 405 may be comprised of cell stack 410, anolyte pump 50, catholyte pump 60, first anolyte reservoir 52, first catholyte reservoir 62, switching module 70, and system controller 80. System module 405 may be disposed within an enclosure 406.

In embodiment 400, second anolyte reservoir 54 may be disposed outside of enclosure 406. Second anolyte reservoir 54 may be in fluid communication with first anolyte reservoir 52 within enclosure 406 via second anolyte supply piping connection 431. Second anolyte reservoir 54 may be in fluid communication with cell stack 410 via second anolyte supply piping connection 433. Second anolyte supply piping connection 431 and second anolyte return piping connection 433 may be comprised of flexible tubing, allowing second anolyte reservoir 54 to be disposed separately from enclosure 406.

In the embodiment of FIG. 4, the fluid connection between cell 410 and first anolyte reservoir 52 comprise first anolyte return valve 59 (not shown). Further, in the embodiment of FIG. 4, the fluid connection between cell 410 an first catholyte reservoir 62 may comprise first catholyte return valve 69 (not shown). First anolyte return valve 59 and first catholyte return valve 69 may be disposed within enclosure 406 and may be communicatively couple to system controller 80.

VRB-ESS 400 may be configured to be in "full-volume" by closing first anolyte return valve 59 (not shown) and first catholyte return valve 69 (not shown). As discussed above in conjunction with FIG. 1, in this configuration, anolyte flowing from cell 10 may be prevented from flowing into first anolyte reservoir 52, and instead may flow into second anolyte reservoir 54 via second anolyte return piping connection 433. As anolyte flows into second anolyte reservoir 54, it may fill, creating an overflow condition within second anolyte reservoir 54. This overflow condition within second anolyte reservoir 54 may cause anolyte to flow out of second anolyte reservoir 54 into first anolyte reservoir 52 via second anolyte supply piping connection 431. Similarly, in this configuration, catholyte flowing from cell 10 may be prevented from flowing into first catholyte reservoir 62, and instead may flow into second catholyte reservoir 64 via second catholyte return piping connection 437. As catholyte flows into second catholyte reservoir 64, it may fill, creating an overflow condition within second catholyte reservoir 64. This overflow condition within second catholyte reservoir 64 may cause catholyte to flow out of second catholyte reservoir 64 into first catholyte reservoir 62 via second catholyte supply piping connection 435. According, in "full-volume" mode, anolyte may flow serially through first anolyte reservoir 52 and second catholyte reservoir 54, and catholyte may flow serially through first catholyte reservoir 62 and second catholyte reservoir 64.

VRB-ESS 400 may be configured to be in "low-volume" mode by opening first anolyte return valve 59 (not shown) and first catholyte return valve 69 (not shown). As discussed above, in conjunction with FIG. 1, in this configuration, anolyte flowing from cell 10 may flow into first anolyte reservoir 52, and catholyte flowing from cell 10 may flow into first catholyte reservoir 62. In embodiment 400, second anolyte return piping connection 433 may be disposed above a fluid level of cell 10 and first anolyte reservoir 52. As such, when first anolyte return valve 59 is in an open position, anolyte may not flow into second anolyte reservoir 54. Similarly, in embodiment 400, second catholyte return piping connection 437 may be disposed above a fluid level of cell 10 and first catholyte reservoir 62. As such, when first catholyte return valve 69 is in an open position, catholyte may not flow into second catholyte reservoir 64. Accordingly, in "low-volume" mode, the electrolyte solution in second anolyte reservoir 54 and second catholyte reservoir 64 is substantially isolated from system module 405. In an alternate embodiment of VRB-ESS 400, second anolyte return piping connection 433 may comprise a second anolyte return valve 58 (not shown) and second catholyte return piping connection 437 may comprise a second catholyte return valve 68 (not shown). In this embodiment, in "low-volume" mode, electrolyte may be prevented from flowing into second anolyte reservoir 54 and second catholyte reservoir 64 by valves 58, 69.

In one embodiment, second anolyte supply piping connection 431 and second anolyte return piping connection 433 may be comprised of flexible tubing, which may allow second anolyte reservoir 54 to be disposed separately from system module 405 and enclosure 406. Similarly, second catholyte supply piping connection 435 and second catholyte return piping connection 437 may be comprised of flexible tubing, which may allow second catholyte reservoir 64 to be disposed separately from system module 405 and enclosure 406.

In one embodiment piping connections 431, 433, 435, 437 may be comprised of any fluid conduit capable of fluidly transporting an electrolytic solution. Such fluid conduit may comprise: braid reinforced plastic tubing; fiber reinforced rubber tubing; multi-layer composite hose; polyethylene tubing; reinforced rubber tubing; or the like. It would be understood by one having skill in the art that any number of different fluid conduit materials may be used without departing from the teachings of the present invention. Additionally, in one embodiment, piping connections 431, 437, 435, 437, second anolyte reservoir 54, and second catholyte reservoir 64, may be self-venting in accordance with the teachings of U.S. patent application Ser. No. 11/701,573 which is hereby incorporated by reference.

In one embodiment, piping connections 431, 433 to second anolyte reservoir 54, and piping connections 435, 437 to second catholyte reservoir 64 may be disposed on the top of said reservoirs 54, 64. In this configuration, electrolytic fluid is circulated through reservoirs 54, 64 by displacing the fluid from a top mounted connection, enhancing safety by ensuring that electrolytic solution cannot be pumped out into the environment in the event of a leak in piping connection 431, 433, 435, 437, a failure of system controller 80, a failure in pumps 50, 60, or a leak in any internal fluid connections as 30, 32, 34, 36 of FIGS. 1,2.

In one embodiment, piping connections 431 and 433 may be connected to second anolyte reservoir 54 above second anolyte reservoir normal liquid level 424 and piping connections 435 and 437 may be connected to second catholyte reservoir 64 above second catholyte reservoir normal liquid level 434. In this configuration, piping connections 431, 433, 435, 437 are self-draining and remain empty when secondary reservoirs 54, 64 are not in use. Further, this configuration ensures that no electrolyte needs to be handled or can be spilled when connecting or disconnecting piping connections 431, 433, 435, 437 to secondary electrolyte reservoirs 54, 64.

In embodiment 400, secondary anolyte reservoir 54 and secondary catholyte reservoir 64 may be deployed separately from enclosure 406 via piping connections 431, 433, 435, 437. Such flexible deployment may allow embodiment 400 to be arraigned in any number of different configurations, enabling VRB-ESS 400 to be deployed in locations with limited or irregular space constraints.

Additionally, enclosure 406 of VRB-ESS 400 may be connected to virtually any sized secondary electrolyte reservoirs 54, 64 via piping connections 431, 433, 435, 437. As such, VRB-ESS 400 may be modularly customized for a wide variety of different capacity needs. By example, FIG. 4 shows two smaller reservoirs 454, 464 having a capacity of approximately 135 gallons each. Accordingly, reservoirs 454, 464 may store approximately 10 kWh of power when used with VRB-ESS 400. Alternatively, FIG. 3 shows reservoirs 454, 464 (the reservoirs connected via piping connections 431, 433, 435, 437). Each of reservoirs 454, 464 may hold approximately 275 gallons of electrolyte, providing 20 kWh of energy storage to VRB-ESS 400. Finally, reservoir 470 may be used in conjunction with VRB-ESS 400. Reservoir 470 may hold 550 gallons of electrolyte, providing VRB-ESS 400 with 40 kWh of energy storage capacity.

Figure 5:
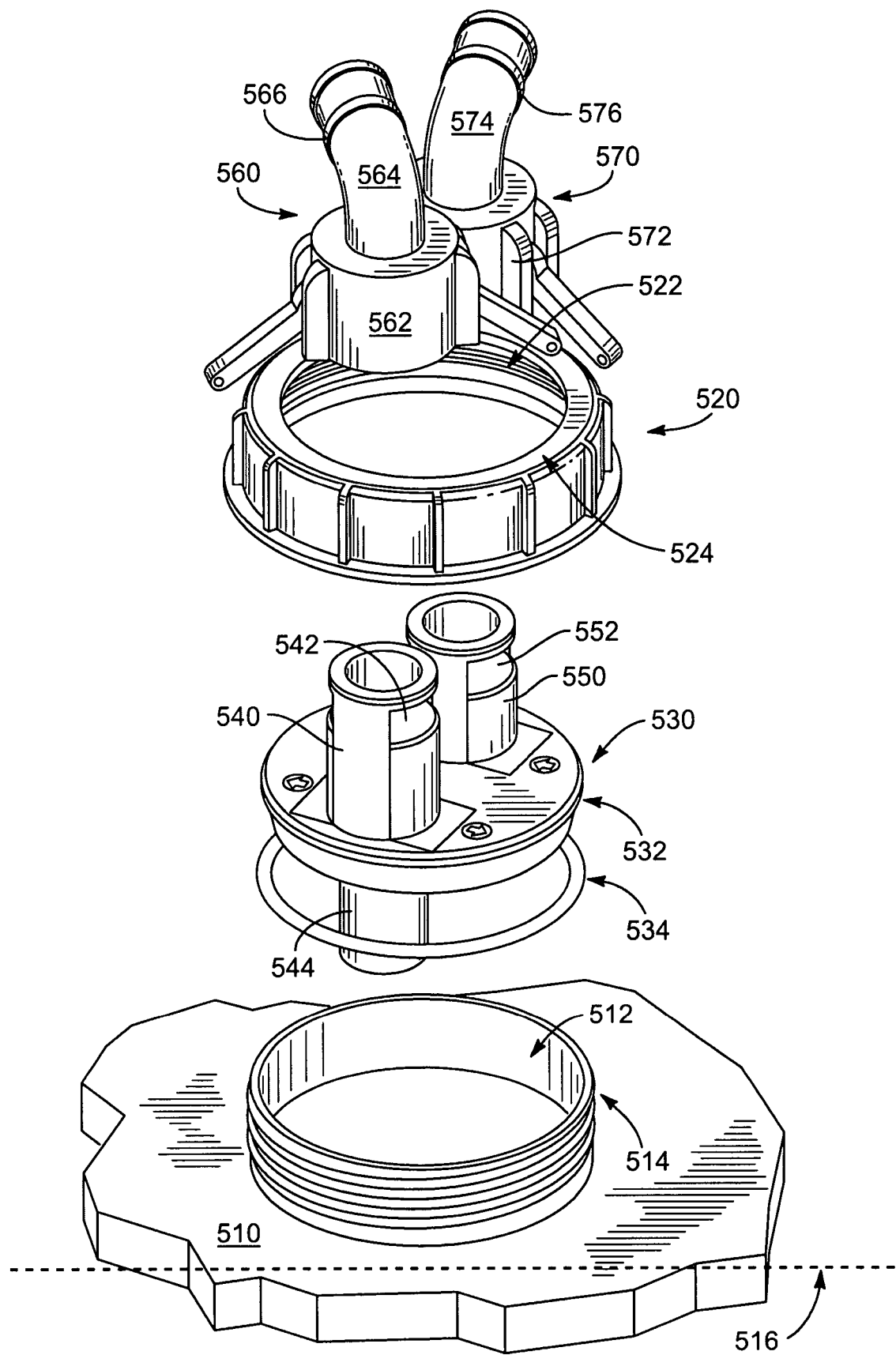
FIG. 5 is an embodiment of a cap mechanism that may be used to enable the use of an Intermediate Bulk Container as a second electrolyte reservoir in the present invention.

Turning now to FIG. 5, the electrolyte used with VRB-ESS systems is generally classified by the United Nations ("UN") and United States Department of Transportation ("DOT") as a hazardous material. As such, the electrolytic solutions of the VRB-ESS must be transported in an Intermediate Bulk Container ("IBC") that has been tested and approved for use in transporting hazardous materials. IBCs may be certified for the shipment of hazardous materials under DOT and/or UN regulations. The certification procedures for such IBCs may be rigorous, typically requiring many months' work and hundreds of hours of testing. The entire IBC must be tested and certified, including any cap mechanism on the IBC.

In one embodiment, the secondary electrolyte reservoirs of the VRB-ESS of the present invention may comprise an IBC. For example, in the embodiment of FIG. 4, any of the reservoirs 54, 64, 454, 464, 470 may be an IBC container. In one embodiment, the IBC used in the VRB-ESS may be the same IBC used to transport the electrolyte to the installation site. In such a configuration, the end-user of the VRB-ESS is not required to transfer the electrolytic solution from the shipping IBC into a separate VRB-ESS reservoir. This may be desirable as it minimizes the contact the end-user of the VRB-ESS must have with potentially hazardous electrolytic solutions. The use of the shipping IBC as secondary electrolyte reservoir is also advantageous as it precludes the possibility that any hazardous electrolytic solution will be spilled into the environment during transfer from a shipping IBC into a secondary electrolyte reservoir. Moreover, the use of a shipping IBC as an electrolyte reservoir obviates the need to ship a separate reservoir component, which may significantly reduce the overall shipping footprint of the VRB-ESS.

IBCs used for shipping must be fitted with a cap mechanism to allow liquids to be transferred into and out of the IBC. As discussed above, the IBC cap must be certified for use in transporting hazardous material, and this certification may be a long and expensive process. However, the stock cap included on shipping IBCs may not allow for a secure attachment to the piping connections used in the VRB-ESS of the present invention. For instance, many IBC caps include one or more ports threaded with the National Pipe Thread ("NPT") threading standard. The use of NPT is problematic as they are generally formed as part of the IBC cap and, as such, rotation of the IBC cap changes the rotational orientation of the ports. Further, the rotational orientation of the cap and ports may not be known until the IBC cap is installed. The rotational interdependence between the cap and the NPT ports may create problems for the installer, as tightening the IBC cap may affect the piping of the VRB-ESS. This interdependence reduces the deployment flexibility of the VRB-ESS by restricting the possible orientations of its piping connections, which may restrict the possible locations of secondary reservoirs relative to the system module. Additionally, NPT ports require a high degree of skill to install and have been known to not seal reliably, creating the risk that hazardous electrolyte will leak into the environment.

Turning now to FIG. 5, FIG. 5 shows one embodiment of a cap mechanism 500 that may be used in conjunction with a standard IBC. Cap mechanism 500 may allow a hazardous material certified IBC 510 to be used as a secondary electrolyte reservoir in a VRB-ESS. Cap mechanism 500 may be used in place of a certified shipping cap (not shown) on IBC 510 once IBC 510 arrives on-site. As such, cap mechanism 500 need not be certified for the transport of hazardous materials as does the standard IBC 510 cap, obviating the need for an expensive and time-consuming certification process for cap mechanism 500.

Cap mechanism 500 may be secured to IBC 510 using cap receptacle 512 on IBC 510. In embodiment 500, the inner diameter and threading pattern 522 of compression ring 520 are configured to be compatible with cap threads 514 disposed on cap receptacle 512 of IBC 510. Compression ring 520 may include lip 524 to compressively engage sealing plate 530. In embodiment 500, sealing plate 530 may comprise grooved portion 532 along its outer diameter. Grooved portion 532 may be adapted to receive o-ring gasket 534. In this embodiment, o-ring gasket 534 may create a seal between sealing plate 530 and IBC cap receptacle 512 as compression ring 520 is tightened on IBC threads 514.

Sealing plate 530 may further comprise fluid outlet bosses 540 and 550. Fluid outlet bosses 540, 550 may be sealably attached to sealing plate 530 or may be integrally formed therefrom. Outlet boss 540 may comprise boss extension 544 to extend into the interior of IBC 510 when cap is installed thereon. In embodiment 500, the length of boss extension 544 may be sufficient to allow boss 540 to be in fluid communication an electrolytic solution contained within IBC 510. Accordingly, boss extension 544 may extend below normal liquid level 516 of IBC 510 when cap mechanism 500 is installed thereon.

Cap mechanism 500 may further comprise fluid connectors 560 and 570. Fluid connectors 560, 570 may comprise sealing mechanism 562, 572 to sealably engage outlet bosses 540, 550. In embodiment 500, outlet boss 540 may comprise indentation 542, and outlet boss 550 may comprise indentation 552. In this embodiment, sealing mechanism 562, 572 may be adapted to sealably engage outlet bosses 540, 550 at indentation 542, 552. It should be understood by one skilled in the art that any number of sealing mechanisms 562, 572 could be used to create a seal between boss 540, 550 and fluid connectors 560, 570.

In embodiment 500, fluid connectors 560, 570 may comprise piping attachment 564, 574. Piping attachments 564, 574 may comprise ridges 566, 576 to engage an interior portion of an attached piping connection. In some embodiments, ridges 566, 576 may be used in conjunction with a compression sleeve (not shown) to sealably attach piping to piping attachment 564, 574.

In embodiment 500, all of the components of cap mechanism 500 may be placed above normal liquid level 516 of IBC 510. As such, cap mechanism 500 may be installed on receptacle 512 of IBC 510 without requiring the installer to touch or otherwise come into contact with any of the liquid within IBC 510. This provides a significant safety advantage since the electrolyte contained within IBC 510 may hazardous.

In embodiment 500, sealing plate 530, with attached outlet bosses 540 and 550, may be rotated independently of compression ring 520. In this embodiment, the installer may determine the rotational orientation of outlet bosses 540, 550 and associated fluid connectors 560, 570, independently of the rotation of compression ring 520. As such, embodiment 500 may enable flexible installation arrangements of IBC 510.

It will be obvious to those having skill in the art that many changes may be made to the details of the above-described embodiments without departing from the underlying principles of the invention. Therefore, the scope of the present invention should be determined only by the following claims.

We claim:

1. A redox flow battery having a low-volume mode and a full-volume mode, comprising:
    a system module, comprising,
        a first anolyte reservoir,
        a first catholyte reservoir, and
        a cell comprising a negative compartment in fluid communication with said first anolyte reservoir and a positive compartment in fluid communication with said first catholyte reservoir;
    a second anolyte reservoir; and
    a second catholyte reservoir;
    wherein in the low-volume mode, the redox flow battery is configured to fluidly isolate contents of said second anolyte reservoir from said first anolyte reservoir and said negative compartment, and to fluidly isolate contents of said second catholyte reservoir from said first catholyte reservoir and said positive compartment; and
    wherein, in the full-volume mode, the redox flow battery is configured to provide for,
        circulating the contents of said second anolyte reservoir and said first anolyte reservoir through a first fluid connection of said second anolyte reservoir to said first anolyte reservoir, and through a second fluid connection of said second anolyte reservoir to said negative compartment while anolyte flows from said negative compartment into said second anolyte reservoir, and
        circulating the contents of said second catholyte reservoir and said first catholyte reservoir through a first fluid connection of said second catholyte reservoir to said first catholyte reservoir, and through a second fluid connection of said second anolyte reservoir to said positive compartment while catholyte flows from said positive compartment into said second catholyte reservoir.

2. The redox flow battery of claim 1, wherein said fluid communication between said first anolyte reservoir and said negative compartment comprises a first anolyte supply connection and a first anolyte return connection, and
    wherein said fluid communication between said first catholyte reservoir and said positive compartment comprises a first catholyte supply connection and a first catholyte return connection.

3. The redox flow battery of claim 2, wherein said first anolyte return connection comprises a first anolyte return valve configured to selectively fluidly couple said second anolyte reservoir with said first anolyte reservoir, and
    wherein said first catholyte return connection comprises a first catholyte return valve configured to selectively fluidly couple said second catholyte reservoir to said first catholyte reservoir.

4. The redox flow battery of claim 3, wherein said first anolyte reservoir is in selective fluid communication with said second anolyte reservoir via a second anolyte supply piping connection configured to fluidly couple said second anolyte reservoir with said first anolyte reservoir, and
    wherein said first catholyte reservoir is in selective fluid communication with said second catholyte reservoir via a second catholyte supply piping connection configured to fluidly couple said second catholyte reservoir with said first catholyte reservoir.

5. The redox flow battery of claim 4, wherein said second anolyte supply piping connection is configured to self-vent, and is comprised of one selected from the group consisting of braid reinforced plastic tubing, fiber reinforced rubber tubing, multi-layer composite hose, polyethylene tubing, and reinforced rubber tubing.

6. The redox flow battery of claim 4, wherein said selective fluid communication between said second anolyte reservoir and said first anolyte reservoir and said negative compartment comprises a second anolyte return piping connection, and
wherein said selective fluid communication between said second catholyte reservoir and said first catholyte reservoir and said positive compartment comprises a second catholyte return piping connection.

7. The redox flow battery of claim 6, wherein when said first anolyte return valve is in a closed position, anolyte flowing from said negative compartment is prevented from flowing into said first anolyte reservoir, flowing instead into said second anolyte reservoir, said flowing the contents of said second anolyte reservoir to circulate with the contents of said first anolyte reservoir and the circulated contents of the second anolyte reservoir and the first anolyte reservoir to flow through the negative compartment.

8. The redox flow battery of claim 7, wherein said flowing into said second anolyte reservoir creates an overflow condition within said second anolyte reservoir, and wherein said overflow condition causes said circulation of the contents of said second anolyte reservoir with the contents of said first anolyte reservoir.

9. The redox flow battery of claim 6, wherein when said first catholyte return valve is in a closed position, catholyte flowing from said positive compartment is prevented from flowing into said first catholyte reservoir, flowing instead into said second catholyte reservoir, said flowing the contents of said second catholyte reservoir circulate with the contents of said first catholyte reservoir and the circulated contents of the second anolyte reservoir and the first anolyte reservoir to flow through the negative compartment.

10. The redox flow battery of claim 9, wherein said flowing into said second catholyte reservoir creates an overflow condition within said second catholyte reservoir, and wherein said overflow condition causes said circulation of the contents of said second catholyte reservoir with the contents of said first catholyte reservoir.

11. The redox flow battery of claim 6, wherein when said first anolyte return valve is in an open position, anolyte flows from said negative compartment into said first anolyte reservoir, and wherein said anolyte flow is substantially prevented from flowing into said second anolyte reservoir.

12. The redox flow battery of claim 6, wherein when said first catholyte return valve is in an open position, catholyte flows from said positive compartment into said first catholyte reservoir, and wherein said catholyte flow is substantially prevented from flowing into said second catholyte reservoir.

13. The redox flow battery of claim 6, wherein said system module further comprises a system controller communicatively coupled to said first anolyte return valve and said first catholyte return valve, and wherein said system controller is configured to control the operation of the first anolyte return value and the first catholyte return valve.

14. The redox flow battery of claim 7, wherein said second anolyte supply piping connection is fluidly connected to a top portion of said second anolyte reservoir and wherein said second anolyte return piping connection is fluidly connected to a top portion of said second anolyte reservoir.

15. The redox flow battery of claim 7, wherein said second catholyte supply piping connection is fluidly connected to a top portion of said second catholyte reservoir and wherein said second catholyte return piping connection is fluidly connected to a top portion of said second catholyte reservoir.

16. The redox flow battery of claim 1, wherein said second anolyte reservoir comprises an Intermediate Bulk Container.

17. The redox flow battery of claim 1, wherein said second catholyte reservoir comprises an Intermediate Bulk Container.

18. The redox flow battery of claim 1, further comprising an enclosure, wherein said system module comprising said first anolyte reservoir, said first catholyte reservoir, and said cell is disposed within said enclosure.

19. The redox flow battery of claim 18, wherein said second anolyte reservoir is disposed at least 5 meters from said enclosure.

20. The redox flow battery of claim 19, wherein said second catholyte reservoir is disposed at least 5 meters from said enclosure.

21. The redox flow battery of claim 18, further comprising a second anolyte pump in fluid communication with said second anolyte reservoir and said first anolyte reservoir, said second anolyte pump to transfer anolyte from said second anolyte reservoir to said first anolyte reservoir.

22. The redox flow battery of claim 20, further comprising a second catholyte pump in fluid communication with said second catholyte reservoir and said first catholyte reservoir, said second catholyte pump to transfer catholyte from said second catholyte reservoir to said first catholyte reservoir.

23. A redox flow battery, comprising:
an enclosure;
a system module disposed within said enclosure, comprising
a system controller,
a cell comprised of a negative compartment, a positive compartment, and a membrane disposed therebetween,
a first anolyte reservoir in fluid communication with said negative compartment, and
a first catholyte reservoir in fluid communication with said positive compartment,
a second anolyte reservoir;
a second catholyte reservoir; and
a configurable piping connection configured to provide for a low-volume mode and full-volume mode wherein,
in said low volume mode, said configurable piping connection fluidly isolates said second anolyte reservoir from said first anolyte reservoir and said negative compartment, and fluidly isolates said second catholyte reservoir from said first catholyte reservoir and said positive compartment,
in said full volume mode, said configurable piping connection provides a first anolyte fluid connection between said second anolyte reservoir and said negative compartment while providing a second anolyte fluid connection between said second anolyte reservoir and said first anolyte reservoir,
in said full volume mode, said configurable piping connection further provides a first catholyte fluid connection between said second catholyte reservoir and said first catholyte reservoir while providing a second catholyte fluid connection between said second catholyte reservoir and said positive compartment.

24. An adaptable redox flow battery, comprising:
a system controller comprising,
a cell having a negative compartment, a positive compartment, and a membrane disposed therebetween,
a first anolyte reservoir in fluid communication with said negative compartment, and
a first catholyte reservoir in fluid communication with said positive compartment of said cell;

a low-volume circulation mode comprising,
- a low-volume anolyte circulation loop configured to circulate contents of said first anolyte reservoir through said negative compartment, and
- a low-volume catholyte circulation loop configured to circulate contents of said first catholyte reservoir through said positive compartment; and a full-volume circulation mode comprising,
- a full-volume, anolyte circulation loop configured to circulate contents of said second anolyte reservoir and said first anolyte reservoir through said negative compartment while anolyte circulates from said negative compartment back into said second anolyte reservoir, and
- a full-volume catholyte circulation loop configured to circulate contents of said second catholyte reservoir and said first catholyte reservoir through said positive compartment while catholyte circulates from said positive compartment back into said second catholyte reservoir,
- wherein said system controller is capable of selectively configuring the redox flow battery to use said low-volume mode or said full-volume circulation mode.

25. A redox flow battery having a low-volume mode and a full-volume mode, comprising:
- a system module, comprising,
- a first anolyte reservoir,
- a first catholyte reservoir, and
- a cell comprising a negative compartment in fluid communication with said first anolyte reservoir and a positive compartment in fluid communication with said first catholyte reservoir;
- a second anolyte reservoir;
- a second catholyte reservoir; and
- a configurable piping connection configured to provide for the low-volume mode and the full-volume mode,
- wherein, in the low-volume mode, the configurable piping connection fluidly isolates the second anolyte reservoir from the first anolyte reservoir and the negative compartment and fluidly isolates the second catholyte reservoir from the first catholyte reservoir and the positive compartment,
- wherein in the full-volume mode, the configurable piping connection fluidly connects an outlet of the negative compartment with an inlet of the second anolyte reservoir and an outlet of the second anolyte reservoir with an inlet of the first anolyte reservoir, and wherein flow from the outlet of the negative compartment creates an overflow condition in the second anolyte reservoir causing anolyte in the second anolyte reservoir to flow into the first anolyte reservoir, and
- wherein in the full-volume mode, the configurable piping connection fluidly connects an outlet of the positive compartment with an inlet of the second catholyte reservoir and an outlet of the second catholyte reservoir with an inlet of the first catholyte reservoir, and wherein flow from the outlet of the positive compartment creates an overflow condition in the second catholyte reservoir causing catholyte in the second catholyte reservoir to flow into the first catholyte reservoir.

26. The redox flow battery of claim 23, wherein in the full-volume mode, an overflow condition is created in the second anolyte reservoir causing anolyte to flow from the outlet of the second anolyte reservoir into the inlet of the first anolyte reservoir.

27. The redox flow battery of claim 23, wherein in the full-volume mode, an overflow condition is created in the second catholyte reservoir causing anolyte to flow from the outlet of the second catholyte reservoir into the inlet of the first catholyte reservoir.

* * * * *

UNITED STATES PATENT AND TRADEMARK OFFICE
CERTIFICATE OF CORRECTION

| | | |
|---|---|---|
| PATENT NO. | : 7,740,977 B2 | Page 1 of 1 |
| APPLICATION NO. | : 11/728521 | |
| DATED | : June 22, 2010 | |
| INVENTOR(S) | : Gary Lepp et al. | |

It is certified that error appears in the above-identified patent and that said Letters Patent is hereby corrected as shown below:

Column 16, Line 34 reads, "...said second anolyte reservoir..." which should read, "...said second catholyte reservoir..."

Column 17, Lines 33 and 34 read, "...contents of the second anolyte reservoir and the first anolyte reservoir..." which should read, "...contents of said second catholyte reservoir and said first catholyte reservoir..."

Column 17, Line 35 reads, "...through the negative compartment." which should read, "...through the positive compartment."

Column 18, Line 65, cancel the text beginning with "and" to and ending "of said cell;" in column 18, line 67 and insert the following text:

--a first catholyte reservoir in fluid communication with said positive compartment of said cell,
a second anolyte reservoir, and
a second catholyte reservoir; and--

Column 20, Line 32 reads, "...reservoir causing anolyte to flow..." which should read, "...reservoir causing catholyte to flow..."

Signed and Sealed this
Twenty-third Day of August, 2011

David J. Kappos
*Director of the United States Patent and Trademark Office*